(12) United States Patent
Jeon

(10) Patent No.: US 7,404,733 B2
(45) Date of Patent: Jul. 29, 2008

(54) DEVICE AND METHOD FOR COUPLING A BATTERY TO A MOBILE TERMINAL

(75) Inventor: Hyung-Woo Jeon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 455 days.

(21) Appl. No.: 11/070,331

(22) Filed: Mar. 1, 2005

(65) Prior Publication Data

US 2005/0197170 A1    Sep. 8, 2005

(30) Foreign Application Priority Data

Mar. 3, 2004  (KR)  ...................... 10-2004-0014405

(51) Int. Cl.
*H01R 3/00*    (2006.01)
(52) U.S. Cl. ..................................... 439/500
(58) Field of Classification Search ................. 439/500; 429/97, 100
See application file for complete search history.

(56) References Cited

U.S. PATENT DOCUMENTS

| 6,492,058 B1 | 12/2002 | Watanabe et al. |
| 6,529,714 B1 | 3/2003 | Nakamura et al. ............ 455/90 |

FOREIGN PATENT DOCUMENTS

| JP | 63-50446 | 4/1988 |
| JP | 63-202067 | 12/1988 |
| JP | 04-42044 | 2/1992 |
| JP | 08-203495 | 8/1996 |
| JP | 09-063716 | 3/1997 |
| JP | 11-339741 | 12/1999 |
| JP | 2001-268812 | 9/2001 |
| JP | 2002-009912 | 1/2002 |
| JP | 2002-124234 | 4/2002 |
| WO | WO 01/75988 A2 | 10/2001 |
| WO | WO 02/058258 A1 | 7/2002 |

*Primary Examiner*—Javaid Nasri
(74) *Attorney, Agent, or Firm*—Lee, Hong, Degerman, Kang & Schmadeka

(57) ABSTRACT

A device and method for coupling a battery to a mobile terminal. The device comprises a main body having a main board on which circuit components are mounted, a battery receiving portion disposed on the main body for receiving the battery, and an input/output connector mounted on a side of the battery receiving portion for supplying electrical power to the main body. A power terminal is disposed on a first side face of the battery for detachably coupling to the input/output connector. The power terminal being arranged to electrically connect to the input/output connector as the power terminal is moved in a longitudinal direction toward the input/output connector. The input/output connector provides an elastic restorative force to the first side face of the battery for maintaining electrical contact between the power terminal and the input/output connector upon a shift in position of the battery within the battery receiving portion.

22 Claims, 6 Drawing Sheets

DEVICE AND METHOD FOR COUPLING A BATTERY TO A MOBILE TERMINAL

CROSS-REFERENCE TO RELATED APPLICATIONS

Pursuant to 35 U.S.C. § 119(a), this application claims the benefit of earlier filing date and right of priority to Korean Application No. 10-2004-0014405, filed on Mar. 3, 2004, the contents of which are hereby incorporated by reference herein in its entirety.

BACKGROUND OF THE INVENTION

1. Field of the Invention

The present invention relates to a device and method for coupling a battery to a mobile terminal capable of maintaining a reliable contact even upon an external impact or deformation of a case of the mobile terminal utilizing an improved connection structure between a main body of a mobile terminal and a battery connected to the main body.

2. Description of the Related Art

A mobile terminal provides multimedia and internet access, and voice and data transmission. The mobile terminal may have a camera for transmitting and/or receiving image shots from other mobile terminals.

In general, a mobile terminal is a communication device a user conveniently carries to make voice transmission/reception to and from another party anywhere. With the rapid development of information communication technologies, a mobile terminal may provide internet connectivity, TV reception, still image or video photographic capability, and image or video transmission/reception capability. Mobile terminals with such functionality are used in a wide variety of applications.

The mobile terminal is provided with a battery. The battery is detachably attached to the mobile terminal and is rechargeable.

A contact terminal is electrically connected to a power terminal of the battery. The contact terminal is coupled to a battery mounting portion of the mobile terminal coupled to the battery.

FIG. 1 is a perspective view illustrating a conventional mobile terminal.

As shown therein, the conventional mobile terminal includes a main body 10. A battery 20 which is detachably attached to the main body 10 supplies power to the conventional mobile terminal.

The main body 10 is provided with a main body case 15 forming an exterior and a main board, not shown, in which a circuit component, not shown, is mounted within the main body case 15. A battery receiving portion 50 formed on an inner side of the main body case 15 receives the battery 20.

A lock 25 is provided along one side of the battery receiving portion 50 to prevent detachment of the battery 20 from the main body 10. A recessed portion 45 couples to a coupling block 60 of the battery 20 on another side of the battery receiving portion 50. An input/output connector 30 exchanging power and data with the battery 20 is provided on the main body 10.

Contact terminals 35 protrude from the input/output connector 30 within the main body 10 contacting the battery 20. The contact terminals 35 are positioned on the input/output connector 30 and coupled to a surface of the main board, not shown, by surface mount technology (SMT).

SMT is also used to connect an electronic component to a conductive pattern on a printed circuit board (PCB) by soldering without connecting through an opening in the PCB.

FIG. 2 is a sectional view illustrating a detachment/attachment structure of a battery in a conventional mobile terminal.

A power terminal 40 is provided at a terminal block 22 and is coupled to the battery 20. The power terminal 40 provides power exchange between the battery 20 and the main body 10.

An attachment/detachment process of the battery of the conventional mobile terminal is described below.

A user aligns the battery 20 along the battery receiving portion 50 formed on the main body 10, as shown in FIG. 1. The user inserts coupling blocks 60 positioned on a first side of the battery 20 into the recessed portion, not shown, of the battery receiving portion 50. The user positions a lock 25 upon one portion of a second side of the battery 20 by engaging the lock 25. The lock 25 prevents detachment of the battery 20 from the main body 10.

The power terminal 40 of the battery 20 contacts with the contact terminal 35 of the input/output connector 30 from its upper portion to the lower portion. A mobile terminal, such as a folder type handset (not shown), which has a battery connected in an up/down direction as described above, may experience several problems.

For example, when a user handles the mobile terminal, or if the mobile terminal is dropped, the power terminal 40 may lose contact with the contact terminal 35 because of a gap formed between coupling blocks 60 and the recessed portion, not shown, of the battery 20. This loss in contact may result in power to the mobile terminal being undesirably turned-off.

The power terminal 40 of the conventional mobile terminal requires for proper operation additional structures such as a separate terminal block, a flexible printed circuit board (FPCB), or the like in the battery 20.

In the conventional mobile terminal, the contact terminal 35 of the input/output connector 30 is restricted in height, typically 1 mm or less, which creates a small contact force. If an exterior of a conventional mobile terminal is deformed, the contact terminals 35 may lose contact with the power terminal 40.

Therefore, there is a need for an apparatus that overcomes the above problems and provides advantages over other mobile terminal battery coupling structures.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one embodiment, a device is disclosed for coupling a battery to a mobile terminal. The device comprises a main body having a main board in which circuit components are mounted, a battery receiving portion disposed on the main body for receiving the battery, and an input/output connector mounted on a side of the battery receiving portion for supplying electrical power to the main body.

A power terminal is disposed on a first side face of the battery for detachably coupling to the input/output connector. The power terminal is arranged to electrically connect to the input/output connector as the power terminal is moved in a longitudinal direction toward the input/output connector.

The input/output connector preferably provides an elastic restorative force to the first side face of the battery for maintaining electrical contact between the power terminal and the input/output connector upon a shift in position of the battery within the battery receiving portion.

The input/output connector may comprise a body portion forming a receiving space therein, a first terminal support proximally located to a first end of the battery receiving portion, and a second terminal support proximally located to a second end of the battery receiving portion.

The input/output connector may further comprise a first contact terminal mounted on the first terminal support. A portion of the first contact terminal may protrude outside the first terminal support for contacting with a specified elastic force to the power terminal. A second contact terminal may be mounted on the second terminal support. A portion of the second contact terminal may protrude outside the second support terminal for contacting the power terminal with the specified elastic force.

The first terminal support may have a first fixing groove therein, and the first terminal support is mounted at the first fixing groove. The second terminal support may have a second fixing groove therein, and the second terminal support is mounted at the second fixing groove.

The main body preferably comprises a battery stop which protrudes from the face of the battery receiving portion toward the first side face of the battery. The battery stop is preferably bent toward the input/output connector. The battery stop, for example, has a height that is greater than the height of the battery. The battery may have a height that gradually decreases from a second side face of the battery positioned opposite to that of the first side face of the battery.

The device may further comprise grooves that are provided along opposing side surfaces of the battery for slidably attaching the battery within the main body. The device may further comprise guide protrusions for mating with the grooves.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a device and a method for coupling a battery to a mobile terminal capable of reliably maintaining a contact despite an external impact or deformation of a case of the mobile terminal. An improved connection structure is disclosed between an input/output connector positioned on a main body of a mobile terminal and a battery connected thereto.

Although the invention is illustrated with respect to a mobile terminal, it is contemplated that the invention may be utilized anywhere it is desired for maintaining electronic conductivity in a mobile communication system when the mobile system is displaced or dropped. Reference will now be made in detail to the preferred embodiments of the present invention, examples of which are illustrated in the accompanying drawings.

Figure 1:
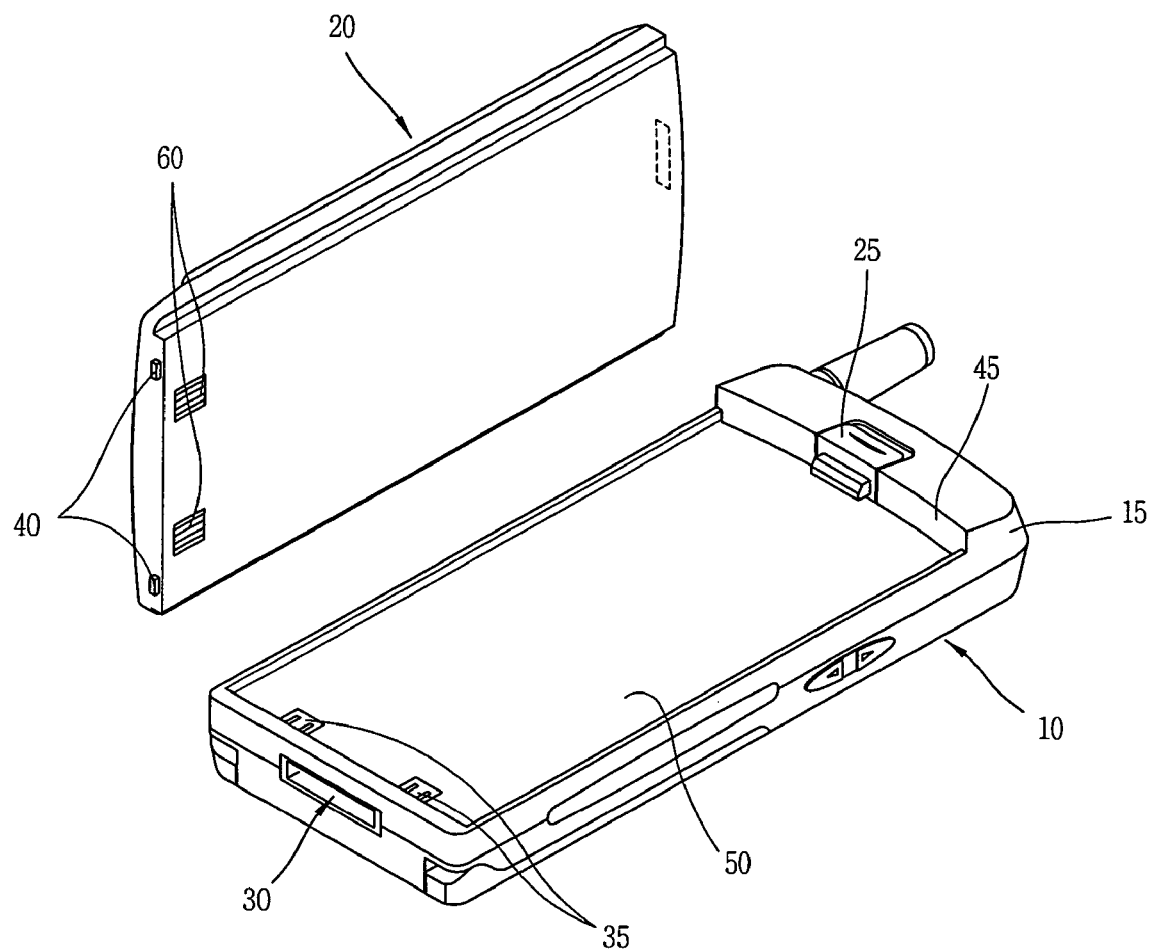
FIG. 1 is a perspective view illustrating construction of a conventional mobile terminal.
Figure 2:
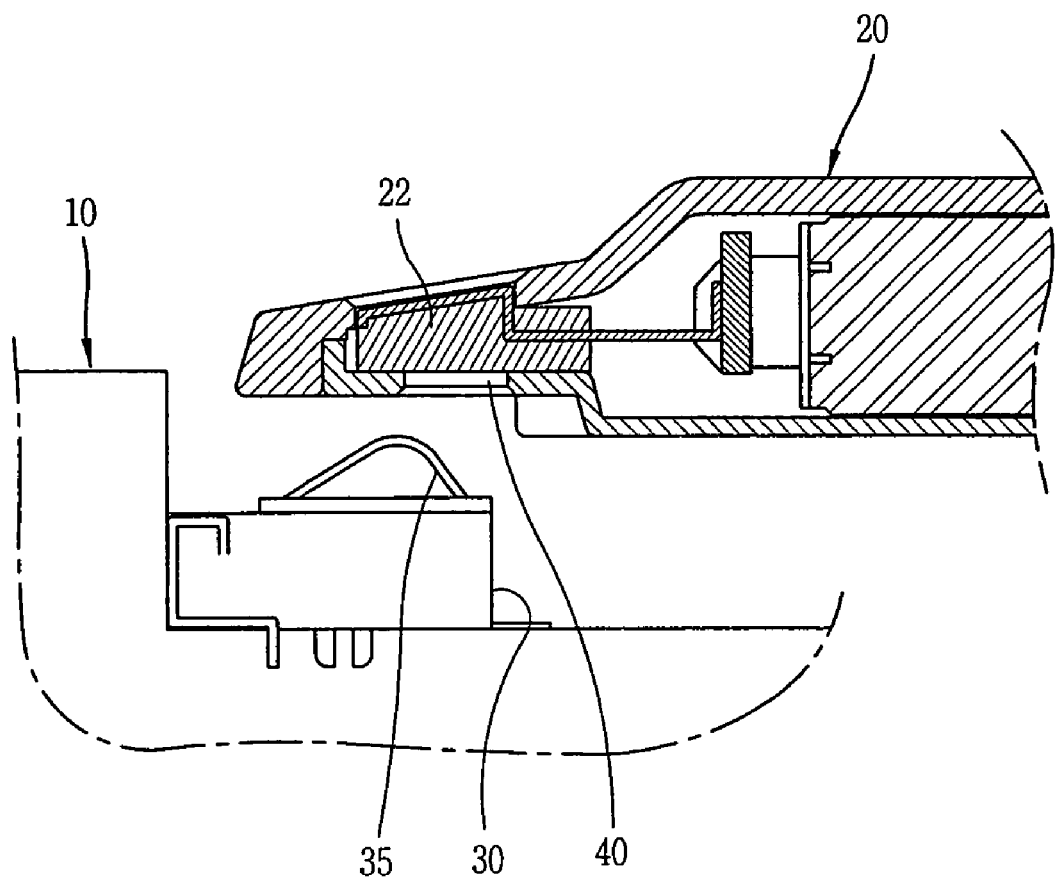
FIG. 2 is a sectional view illustrating a structure for detachment/attachment of a battery of a conventional mobile terminal.
Figure 3:
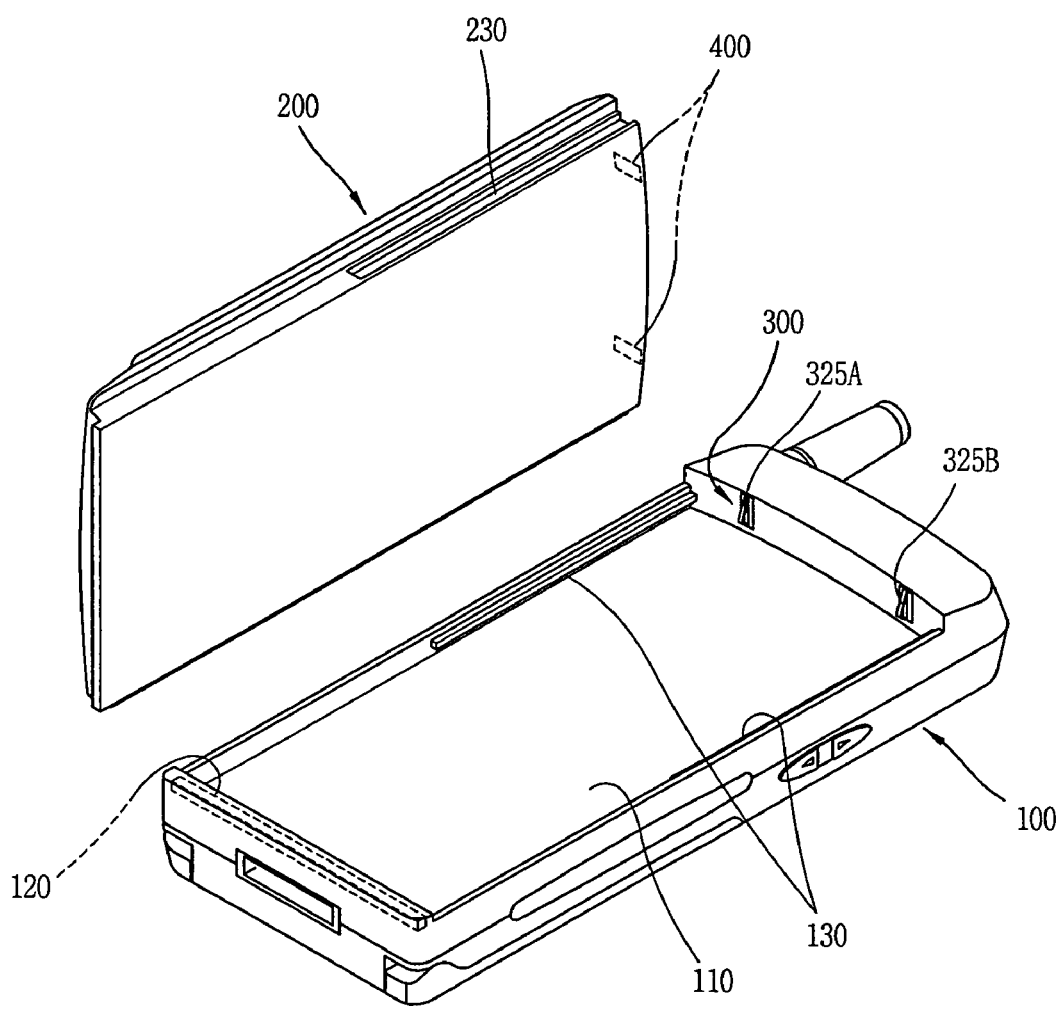
FIG. 3 is a perspective view illustrating an embodiment of the battery coupling structure of the present invention.

FIG. 3 is a perspective view illustrating an embodiment of the present invention.

As shown therein, a mobile terminal according to the present invention includes a main body 100 provided with a battery receiving portion 110 where a battery 200 is received and having therein a main board, not shown. The main board, not shown, is mounted with a circuit component, not shown, to provide transmission/reception of information. A battery 200 is detachably coupled to the main body 100 for supplying power to the main body 100. An input/output connector 300 is mounted on a side face of the battery receiving portion 110 of the main body 100. A power terminal 400 is positioned on a side face of the battery 200. The power terminal 400 is connected to the input/output connector 300 by moving the battery 200 along a longitudinal direction.

The main body 100 may take on various configurations. Some configurations of the main body 100 may include a folder type mobile terminal having a folder part including a display, and a flip type mobile terminal having a flip portion including a microphone. Other configurations for the main body 100 may include a sliding type mobile terminal having a sliding folder part having a display at a certain distance, and a separating type mobile terminal for detachment of a speaker in a main body from a display in the main body, or the like.

A battery stop 120 protrudes, for example, a specified height from a side face opposite to the side face where the input/output connector 300 of the battery receiving portion 110 is mounted. The battery stop 120 is preferably bent toward the input/output connector 300.

Figure 7A:
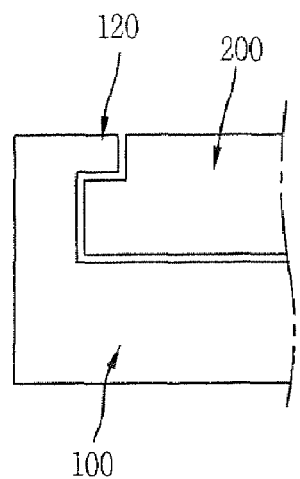
FIGS. 7A and 7B are cross-sectional views showing the battery installed in the mobile terminal.

The battery 200, for example shown in FIG. 7A, has a height step discontinuity along a second side face which is opposite to the side face, i.e., the first side face, located at the power terminal 400. The height of the step discontinuity is preferably smaller than a height of the battery stop 120.

Figure 7B:
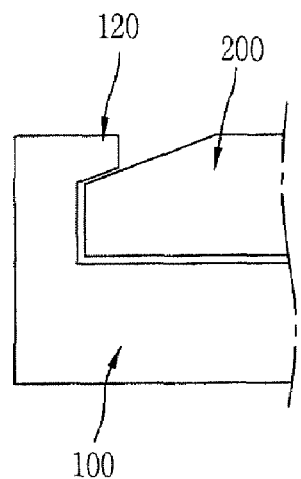

In yet another example shown in FIG. 7B, the battery 200 may have no step discontinuity. In this example, the battery stop 120 has a height greater than that of the battery 200. In one variation of this example, a height of the battery may be tapered to gradually decrease from a first side face of the battery at the power terminal 400, to an opposite side face, i.e., a second side face of the battery 200. The height of the battery is smaller than the height of the battery stop 120.

Grooves 230, for example, are formed along opposite side faces of the battery 200. Guide protrusions 130 protrude, mate with the grooves 230, and formed respectively on the side faces of a battery receiving portion 110. Each of the guide protrusions 130 have a width that is narrower than a corresponding width of the grooves 230. Consequently, when the battery 200 is coupled to the battery receiving portion 110, a small gap is created between the grooves 230 and the guide protrusions 130.

Figure 4:
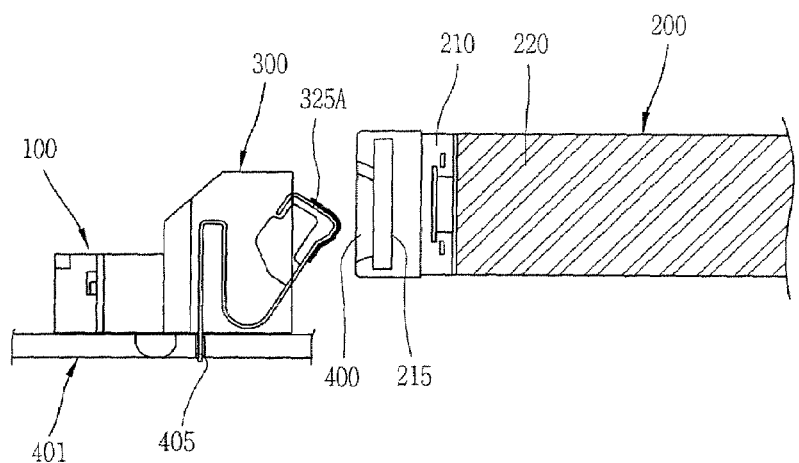
FIG. 4 is a perspective view illustrating the input/output connector for one embodiment of the present invention.
Figure 5:
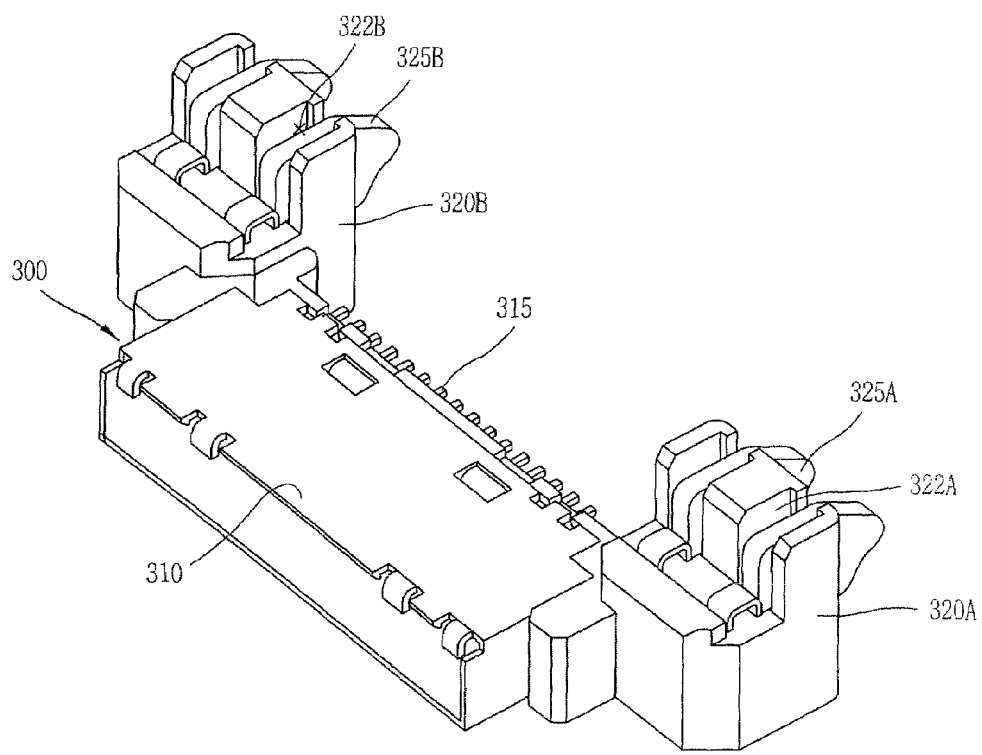
FIG. 5 is a plan view illustrating the input/output connector for an embodiment of the present invention.
Figure 6:
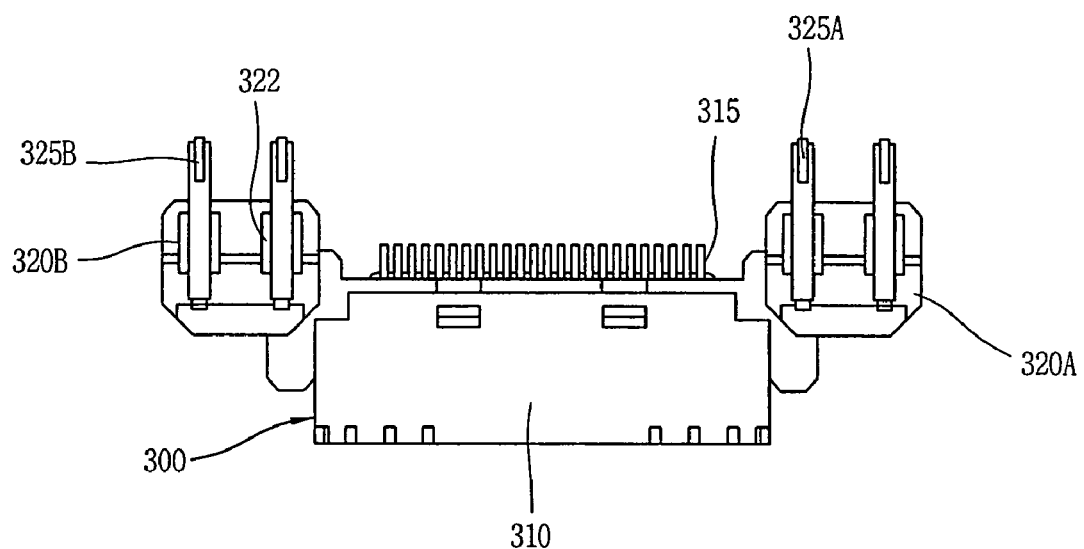
FIG. 6 is a sectional view illustrating the input/output connector for an embodiment of the present invention.

FIG. 4 is a perspective view illustrating the input/output connector of an embodiment of the present invention. FIG. 5 is a plan view illustrating the input/output connector of the present invention.

The input/output connector 300 includes a body portion 310 having a plurality of pins 315 which are exposed to form a data port. A first terminal support 320A is provided at one end of a body portion 310 and a second terminal support 320B is provided at the other end of the body portion 310. The first and second terminal supports 320A, 320B have fixing grooves 322A, 322B therein. Contact terminals 325A, 325B positioned at the fixing grooves 322A, 322B protrude from the first and the second terminal supports 320A, 320B to outside the mobile terminal and contact the power terminal 400.

An elastic restoration force of contact terminals 325A, 325B becomes stronger as a protruding length of the contact terminals 325A, 325B become longer. If the elastic restoration force, in one example, between the power terminal 400 and the contact terminals 325A, 325B becomes too great, or, in another example, if the protruding length of the contact terminals 325A, 325B becomes too long, a user will be required to exert a large force to attach the battery 200 to the main body 100, shown in FIG. 3. The contact terminals 325A, 325B preferably have a moderate protruding length. In the present invention, the protruding length preferably is set to approximately 2 mm.

A pogo pin preferably is used as the contact terminals 325A, 325B to secure conductivity and maintain integrity of the contact terminals 325A, 325B with repeatable tension settings.

The power terminal 400, in this example, has a terminal pattern formed on a protection circuit 215. The protection circuit 215 is positioned on the battery 200. The protection circuit 215 prevents an over-current condition of the battery 200 and prevents exposure of the battery 200 to the surroundings. In this example, the protection circuit 215 is mounted on a printed circuit board (PCB) 210. The PCB 210 is connected at one end of the battery 200 on which a circuit component, not shown, is mounted for protecting the battery 200. The power terminal 400, in this example, directly contacts the contact terminals 325A, 325B of the input/output connector 300 without the requirement of a special structure, such as a terminal block, for connecting to the battery 200.

The contact terminals 325A, 325B are mounted on a main board 401, of a mobile terminal by standard surface mounting techniques (SMTs). The contact terminals 325A, 325B provide added rigidity to the mobile terminal during construction of the mobile terminal, for example, when adding a hole 405 to the main board 401, of the mobile terminal. In another example, the contact terminal 325A, 325B provide added rigidity to the mobile terminal structure when lower ends of the contact terminals 325A, 325B are soldered to the main board 401.

The operation of an embodiment of the present invention will now be described. For the following explanation, please refer to FIGS. 3-6.

The guide protrusions 130 of the battery receiving portion 110 pass through the grooves 230 formed on opposite side faces of the battery 200 upon the battery 200 being moved in a longitudinal direction. When the battery 200 is received in the battery receiving portion 110, the battery 200 comprising a power terminal 400 contacts the contact terminals 325A, 325B of the input/output connector 300. The power terminal 400 push against the contact terminals 325A, 325B with an elastic force for maintaining contact with contact terminals 325A, 325B. If a user removes his or her hands from the battery 200, the battery 200 is pushed backward a specified distance by the elastic force of the contact terminals 325A, 325B. A side face opposite to the side face of the power terminal 400 is stopped by the battery stop 120. Detachment of the battery 200 is prevented by the battery stop 120 and the guide protrusions 130.

Upon the battery 200 being moved by a user in a longitudinal direction for contacting the input/output connector 300, the contact terminals 325A. 325B protrude a relatively long length along a longitudinal direction of the main body 100. As the elastic force between the power terminal 400 and the contact terminals 325A, 325B increases, the reliability of the connection is improved. The present invention achieves a reliable contact preventing the power terminal 400 of the battery 200 from losing contact with the contact terminals 325A, 325B, even upon application of an external force to the main body 100.

The power terminal 400 of the present invention preferably forms a terminal pattern on a protection circuit of the battery. The present invention does not require a special structure for connecting the power terminal 400 to the input/output connector 300. The present invention, constructed as above, contributes to stabilization, and results in an improvement in reliability and miniaturization of a mobile terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Although the present invention is described in the context of a mobile terminal, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

What is claimed is:

1. A device for coupling a battery to a mobile terminal, the device comprising:
   a main body having a main board on which circuit components are mounted;
   a battery receiving portion disposed on the main body for receiving the battery;

an input/output connector mounted on a side of the battery receiving portion for supplying electrical power to the main body; and a power terminal disposed on a first side face of the battery for detachably coupling to the input/output connector, the power terminal being arranged to electrically connect to the input/output connector as the power terminal is moved in a longitudinal direction toward the input/output connector, wherein the input/output connector provides an elastic restorative force to the first side face of the battery for maintaining electrical contact between the power terminal and the input/output connector upon a shift in position of the battery within the battery receiving portion, and wherein the input/output connector comprises a body portion forming a receiving space therein, a first terminal support located proximal to a first end of the battery receiving portion, and a second terminal support located proximal to a second end of the battery receiving portion.

2. The device of claim 1, wherein the power terminal is a terminal pattern formed on a protection circuit, the protection circuit preventing exposure of the battery to an over-current condition.

3. The device of claim 2, wherein the protection circuit prevents exposure of the terminal pattern to the environment.

4. The device of claim 1, wherein the input/output connector further comprises:

a first contact terminal mounted on the first terminal support, a portion of the first contact terminal protruding outside the first terminal support for contacting the power terminal with a first specified elastic force; and a second contact terminal mounted on the second terminal support, a portion of the second contact terminal protruding outside the second support terminal for contacting the power terminal with the second specified elastic force.

5. The device of claim 4, wherein the first contact terminal is extended through a hole in the main board and soldered to the main board.

6. The device of claim 4, wherein the second contact terminal is extended through a hole in the main board and soldered to the main board.

7. The device of claim 4, wherein the first and the second contact terminals are pogo pins.

8. The device of claim 1, wherein the first terminal support has a first fixing groove therein, and the first terminal support is mounted at the first fixing groove.

9. The device of claim 1, wherein the second terminal support has a second fixing groove therein, and the second terminal support is mounted at the second fixing groove.

10. The device of claim 1, wherein the main body is provided with a pin protruding externally from the main body to a data port.

11. The device of claim 1, wherein the main body comprises a battery stop which protrudes from the side of the battery receiving portion toward the first side face of the battery.

12. The device of claim 11, wherein the battery stop is bent toward the input/output connector.

13. The device of claim 12, wherein the battery stop has a height that is greater than the height of the battery.

14. The device of claim 11, wherein the battery has a height that gradually decreases from a second side face of the battery positioned opposite to that of the first side face of the battery.

15. The device of claim 11, wherein the battery has a height proximal to a second side face of the battery that is smaller than the height of the battery stop.

16. The device of claim 11, wherein the battery has a height step discontinuity along a second side face of the battery.

17. The device of claim 1, further comprising grooves that are provided along opposing side surfaces of the battery for slidably attaching the battery within the main body.

18. The device of claim 17, further comprising guide protrusions for mating with the grooves.

19. A battery device for coupling a battery to a mobile terminal, the device comprising:

a main body having a main board on which circuit components are mounted;

a battery receiving portion disposed on the main body for receiving the battery;

an input/output connector mounted on a side face of the battery receiving portion for supplying electrical power to the main body;

a power terminal disposed on a first side face of the battery for detachably coupling to the input/output connector, the power terminal being arranged to electrically connect to the input/output connector as the power terminal is moved in a longitudinal direction toward the input/output connector; and a battery stop disposed on the main body, the battery stop protruding from the side face of the battery receiving portion toward the first side face of the battery and bent toward the input/output connector, wherein the input/output connector provides an elastic restorative force to the first side face of the battery for maintaining electrical contact between the power terminal and the input/output connector upon a shift in position of the battery within the battery receiving portion, and wherein the input/output connector further comprises a body portion forming a receiving space therein, a first terminal support located proximal to a first end of the battery receiving portion, and a second terminal support located proximal to a second end of the battery receiving portion.

20. The device of claim 19, wherein the battery stop has a height greater than the height of the battery.

21. The device of claim 19, wherein the battery has a height that gradually decreases from a second side face of the battery which is opposite to that of the first side face of the battery.

22. The device of claim 19, wherein the battery has a step discontinuity in height along a second side face of the battery which is opposite to the first side face of the battery.

* * * * *